US 6,695,523 B2

(12) United States Patent
Lewis et al.

(10) Patent No.: US 6,695,523 B2
(45) Date of Patent: Feb. 24, 2004

(54) CONNECTOR SYSTEM FOR HARDCOPY APPARATUS

(75) Inventors: Richard H. Lewis, Barcelona (ES); Ismael Chancion, Barcelona (ES); Jose Antonio Alvarez, Madrid (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/941,580

(22) Filed: Aug. 30, 2001

(65) Prior Publication Data

US 2003/0044223 A1 Mar. 6, 2003

(51) Int. Cl.[7] ................................................. F16B 9/02
(52) U.S. Cl. ...................... 403/187; 403/396; 403/256; 403/188; 403/258; 400/691; 400/693
(58) Field of Search ................. 403/187, 188, 403/390.4, 384, 389, 396, 256, 257, 258, 260, 261; 400/320, 323, 691, 693, 651, 654, 656

(56) References Cited

U.S. PATENT DOCUMENTS

| | | | | |
|---|---|---|---|---|
| 4,030,846 A | * | 6/1977 | Flototto | 403/231 |
| 4,116,573 A | * | 9/1978 | Fuchs | 403/264 |
| 4,405,253 A | * | 9/1983 | Stockum | 403/231 |
| 4,560,295 A | * | 12/1985 | Fujiwara et al. | 400/637.1 |
| 5,476,463 A | * | 12/1995 | Boachie-Adjei et al. | 606/61 |
| 6,036,380 A | * | 3/2000 | Astroth et al. | 400/23 |
| 6,273,624 B1 | * | 8/2001 | Nishimura et al. | 400/637.1 |
| 2002/0006308 A1 | * | 1/2002 | Maleken | |

* cited by examiner

*Primary Examiner*—Lynne H. Browne
*Assistant Examiner*—Giovanna M Collins
(74) *Attorney, Agent, or Firm*—Lee & Hayes, PLLC (57) ABSTRACT

A connector system substantially rigidly connects a carriage guide rod to a base support structure of a hardcopy apparatus and includes a connector element rigidly fixable to the base support structure. The connector system has a pin which is held in a first bore in the guide rod by a retaining screw in a second bore of the guide rod. The connector system can be adjusted with six degrees of freedom before final fixing. The introduction of a further screw in a threaded part of the first bore permits vertical adjustment of the pin. The connector system can alternatively be used to rigidly secure a printer platen.

26 Claims, 6 Drawing Sheets

CONNECTOR SYSTEM FOR HARDCOPY APPARATUS

FIELD OF THE INVENTION

The present invention relates to a system for and method of connecting two bodies rigidly together.

BACKGROUND OF THE INVENTION

Various kinds of hardcopy apparatus require systems for providing rigid connections between different components of the hardcopy apparatus. For example, to avoid printing defects, a printer carriage guide rod needs to be rigidly attached to a base support element. In addition, the attachment should be achieved without significant loss of straightness of the rod, which would also cause printing defects.

The Hewlett-Packard Design jet printer models 500, 500 ps, 800 and 800 ps as disclosed in European patent application 00118444.9 have spacing members between a carriage guide rod and a base support element, the spacing members having surfaces which are precisely machined in a jig to eliminate position errors between the rod and the base support element. The machining operation is relatively expensive.

Existing requirements and problems in satisfactorily attaching guide rods to their support elements include:

- stiffening of the guide rod should be achieved with means occupying as small a space as possible;
- guide rods themselves should have as small a diameter as possible for reasons of cost;
- this leads to insufficient rod rigidity for reasons of low natural frequency (causing printing defects, such as "vertical banding"), and also for excessive deflection (causing excessive pen to paper space change);
- the system should allow the option of vertical adjustment without significant movement in the horizontal direction; this is either to correct inherent vertical bow of the rod (generally caused by deflection due to self-weight) or to deliberately induce curvature to compensate non-straightness of other elements of the guide system;
- since the position of the rod relative to the base support is not well controlled, the system that connects these two bodies in space must adjust to fill the gap without causing significant deformation or loss of position of the rod (which must be precisely positioned to ensure printing performance);
- the connection system should allow self-alignment of the six degrees of freedom between the two bodies;
- as mentioned above, machining a connection surface in a jig to eliminate position errors between the two bodies is relatively expensive and, furthermore, does not allow possible adjustment to compensate for non-straightness of other elements of the guide system;
- to avoid cost and cycle time in production, the connection system should not require the use of special tooling or a complicated adjustment process.

SUMMARY OF THE INVENTION

The present invention seeks to overcome or reduce one of more of the above problems.

According to a first aspect of the present invention, there is provided apparatus comprising first and second bodies and a connector system connecting the two bodies rigidly together, the first body having intersecting first and second bores and the connector system comprising a connector element and a retaining element, the connector element comprising a first connector portion located in the first bore and a second connector portion rigidly connected to the second body, and the retaining element being located in the second bore in retaining engagement with the first connector portion in the first bore.

According to the second aspect of the present invention, there is provided a method of connecting rigidly together a guide member and a base support structure of a carriage guide arrangement of hardcopy apparatus comprising the steps of providing supports for the guide member at or adjacent its ends, and providing points of attachment at one or more intermediate positions between the supports by providing first and second intersecting bores in the guide member at each point of attachment, locating a connection system at each point of attachment, the connector system comprising a connector element and a retaining element, the connector element comprising first connector portion and a second connector portion, locating the first connector portion in the first bore, and rigidly connecting together the guide member and the base support structure by firmly securing the second connector portion of the connector element to the base support structure and by inserting the retaining element in the second bore to retain the first connector portion in the first bore.

According to a third aspect of the present invention, there is provided a hardcopy apparatus comprising a fixed supporting structure and a carriage guide arrangement comprising a base support fixedly mounted on first and second end supports and a carriage guide rod supported by the first and second end supports, the base support defining a track spaced from the rod, a movable carriage being arranged to move along the guide rod and the track, and a respective connector system being provided at one or more spaced locations along the guide rod to connect rigidly together the guide rod and the base support, the guide rod being provided at each the location with first and second intersecting cylindrical bores, at least the second bore being threaded, each the connector system comprising a connector element and first and second retaining screws, the connector element comprising first and second connector portions, the first connector portion having a cylindrical pin located in the first bore and the second connector portion having a through hole, the first retaining screw being located in the second bore in retaining engagement with the cylindrical pin in the first bore, the base support being provided at each the location with a threaded hole, and the second retaining element passing through the hole in the second connector portion and being located in the threaded hole in the base support whereby to rigidly connect together the guide rod and the base support at the one or more spaced locations.

According to a fourth aspect of the present invention, there is provided a connector system for connecting a first body with intersecting first and second bores to a second body, the system comprising a connector element and a retaining element, the connector element having a first connector portion arranged to be inserted into the first bore and a second connector portion arranged to be rigidly connected to the second body, and the retaining element being arranged to be inserted into the second bore to engage the first connector portion in the first bore and to retain the first connector portion firmly in position.

According to a fifth aspect of the present invention, there is provided a method of connecting rigidly together first and second bodies comprising the steps of providing first and second intersecting bores in the first body, providing a connector system comprising a connector element and a retaining element, the connector element comprises first and second connector portions, inserting the first connector portion in the first bore, inserting the retaining element in the second bore to engage the first connector portion and to retain it in the first bore, and firmly securing the second connector portion to the second body.

BRIEF DESCRIPTION OF THE DRAWINGS

Preferred embodiments of the present invention will now be described, by way of example only, with reference to the accompanying drawings, of which.

DETAILED DESCRIPTION OF PREFERRED EMBODIMENTS

Figure 1:
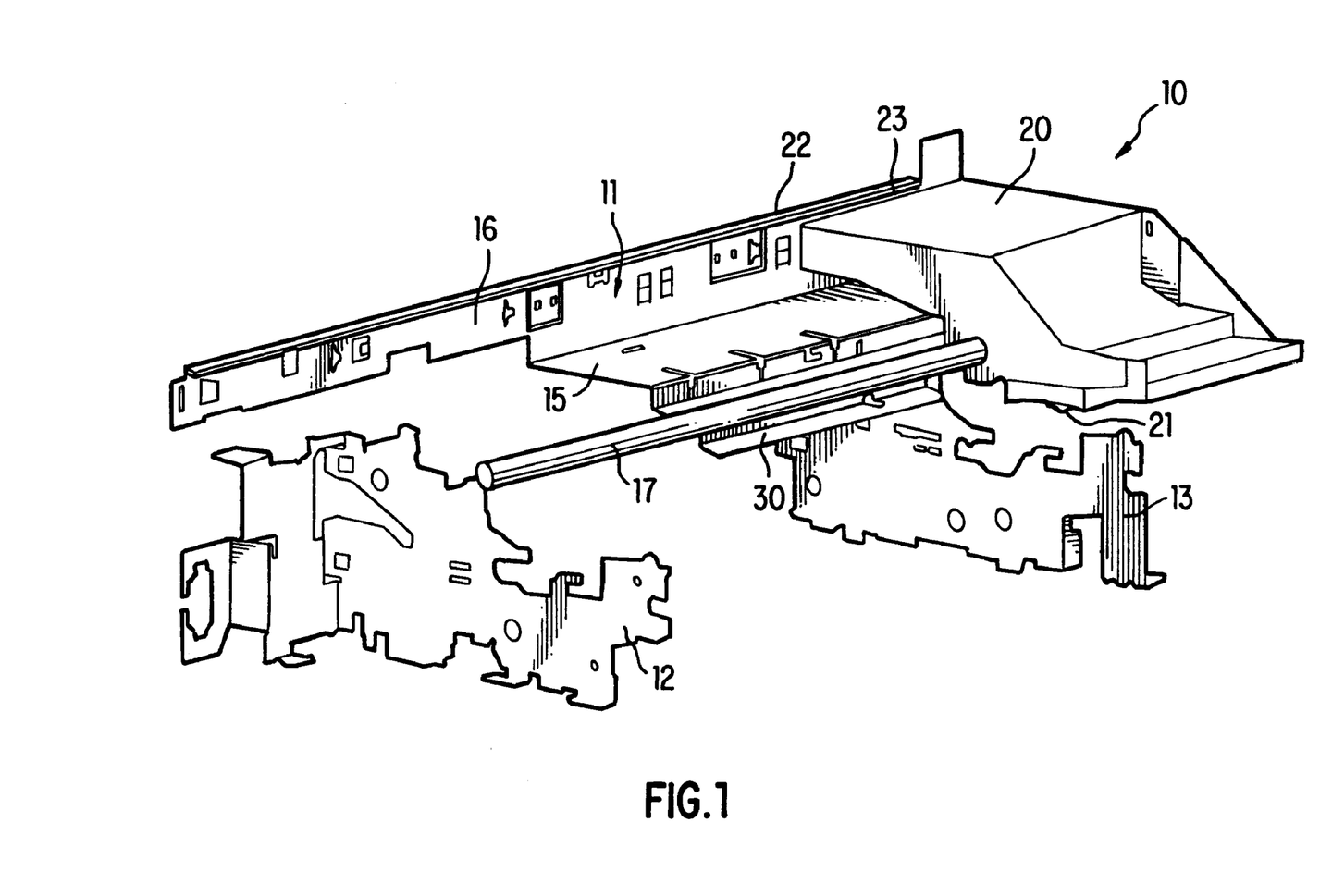
FIG. 1 is a partially broken-away perspective view of the carriage guide arrangement for a hardcopy apparatus in accordance with a first embodiment of the present invention.

Referring to the drawings, FIG. 1 shows the carriage guide arrangement 10 of a hardcopy apparatus in the form of a printer. The printer comprises a fixed supporting structure comprising a base support 11 fixedly mounted on a left end support 12 and a right end support 13. Supports 11, 12 and 13 are of a sheet steel material. Also mounted on the supports 12 and 13 is a guide rod 17 upon which travels a printer carriage 20. Rod 17 is of high-chrome carbon steel. Carriage 20 carries printheads 21. Base support 11 is generally L-shaped in cross-section comprising a substantially horizontal portion 15 and a substantially vertical rear portion 16. At its top, rear portion 16 has a track 22 which is of sheet metal and which defines a second guide for engagement with a slider member 23 of the carriage 20 to stabilise the carriage and to prevent rotation thereof.

As described so far, the arrangement may have one or more of the problems mentioned in the introduction, namely the rod 17 may not be straight, its straightness may need to be adjusted to compensate for inaccuracies in other components, and/or the rod may deflect and/or vibrate as the carriage 20 moves along it between the end supports 12 and 13.

Figures 2, 6, 7, 8:
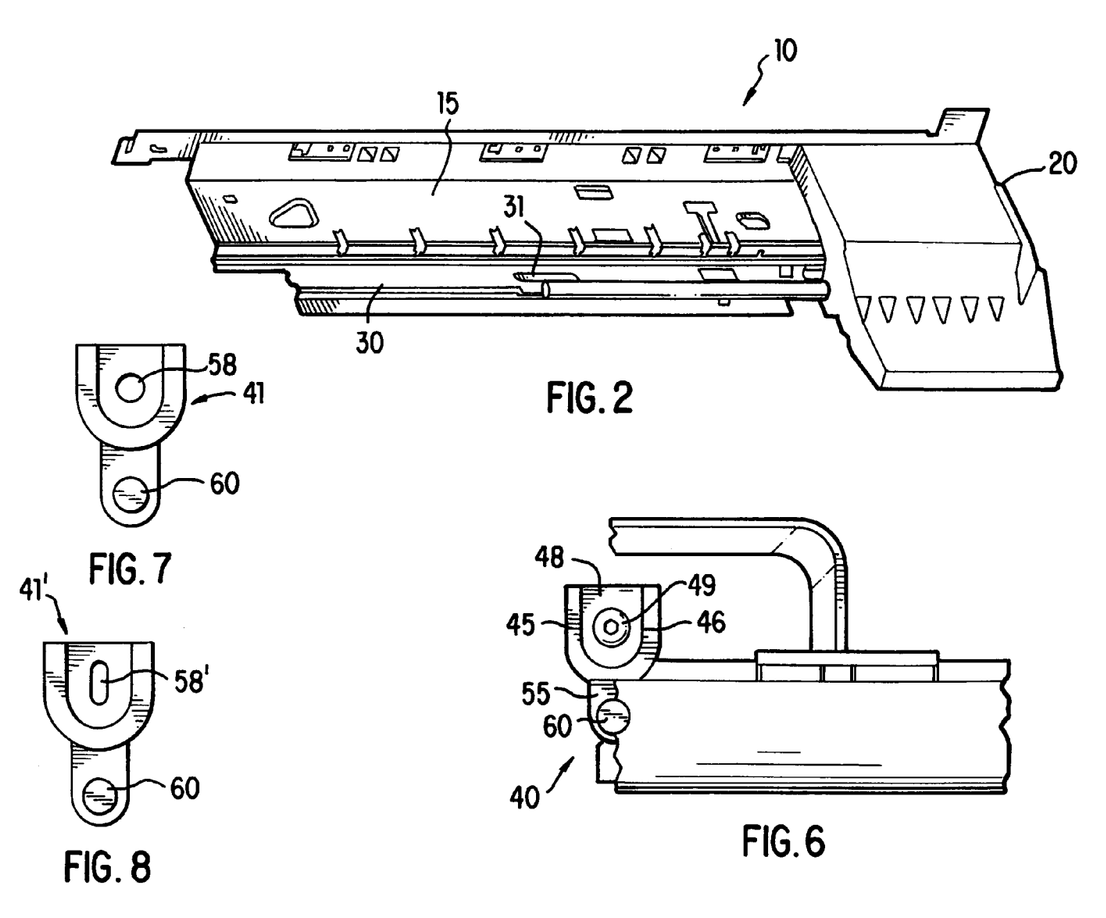
FIG. 2 is a perspective view of a base support structure of the apparatus of FIG. 1 with a carriage guide rod shown partially broken away.
FIG. 5 is a top perspective view and FIGS. 6 is a top view of the connector system of FIGS. 3 and 4 with the carriage guide rod shown partially broken away.
FIG. 7 is a top view of a connector element of the connector system.
FIG. 8 is a top view of a modified connector element.

Accordingly, in the arrangement of FIG. 1 the front of the portion 15 of base support 11 is provided with an extension 30, see FIG. 2. At a part of extension 30 lying substantially centrally between end supports 12 and 13, there is provided a depression 31 in which is provided a connector system 40 in accordance with the present invention.

Figure 3:
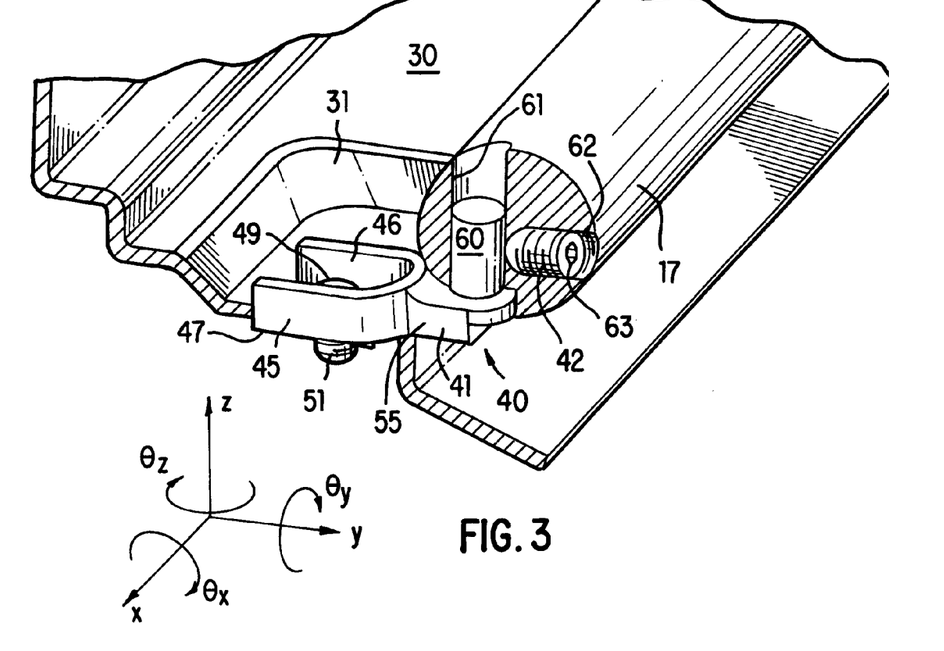
FIG. 3 is an enlarged side perspective view of a connector system used in the apparatus of FIGS. 1 and 2.
Figure 4:
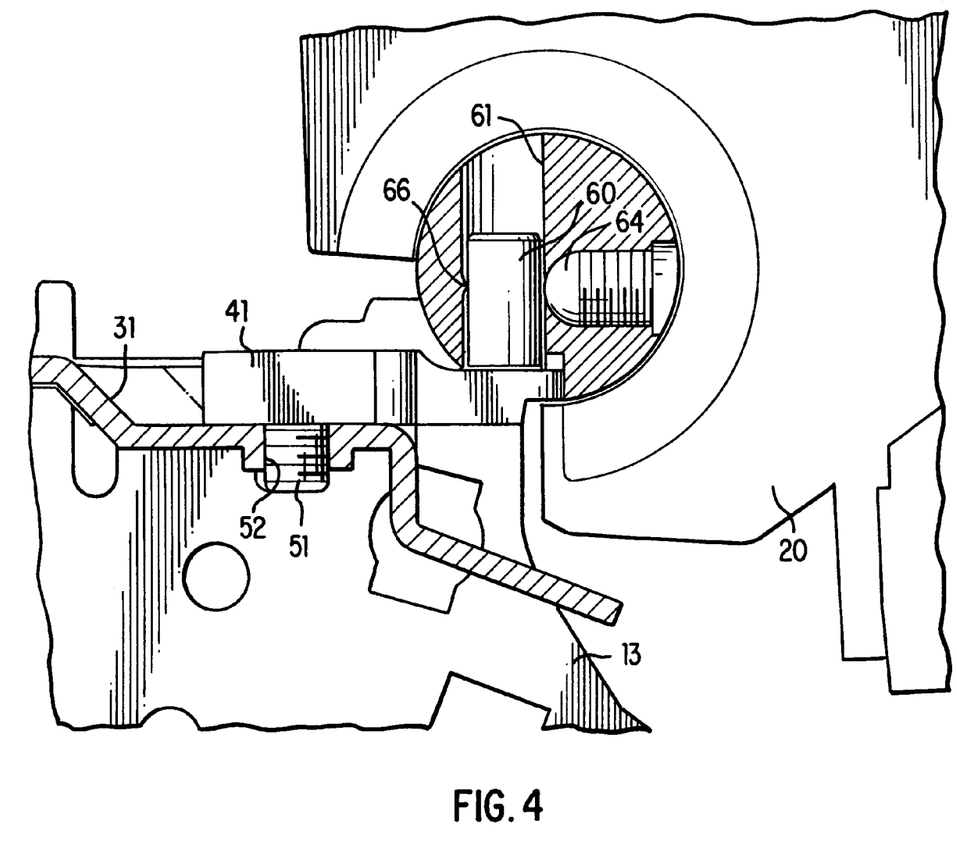
FIG. 4 is a further enlarged sectioned side view of the connector system of FIG. 3.
Figure 5:
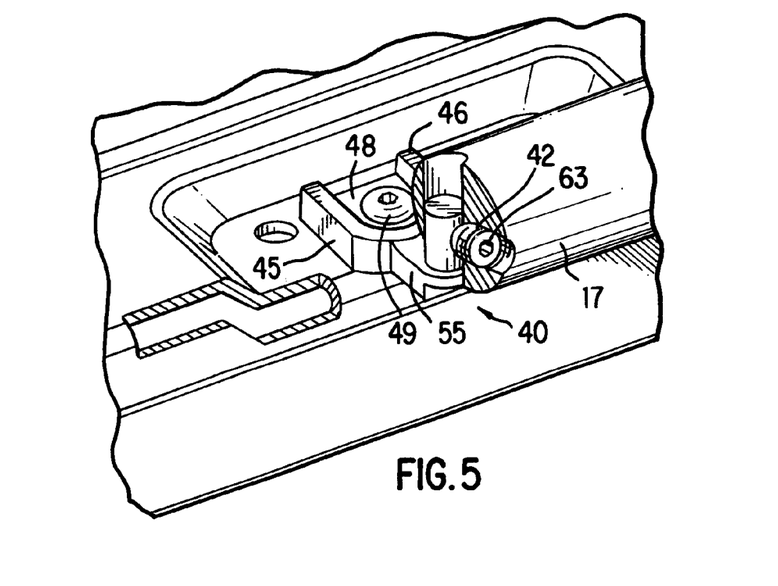

Connector system 40, as seen in FIG. 3, comprises a rigid connector element 41 of steel and a retaining element in the form of a steel grub screw 42. Connector element 41 comprises a substantially arch-shaped part 44 comprising arms 45, 46 the lower edges 47 of which are bridged by a sheet member 48. Sheet member 48 has a generally centrally located hole 58, FIG. 7, which receives with play the threaded shank 51 a screw 49. Shank 51 is arranged to engage with a threaded hole 52, see FIG. 4, provided in depression 31. After screw 49 has been inserted in hole 52, but before it is tightened, there is a degree of play between the connector element 41 and extension 30; tightening of the screw 49 however, prevents further relative movement of the connector element 41.

The middle region of the arch-shaped part 44 is provided with an integral limb 55 from which projects a cylindrical pin element 60.

At its central region corresponding with the location of the connector system 40, carriage guide rod 17 is provided with a cylindrical bore 61 with a diameter slightly larger than that of pin 60, so that it can receive the pin with a degree of play. The mouth at the bottom of bore 61 is suitably widened to accommodate the limb 55. Bore 61 has a length greater than the length of pin 60.

The rod 17 has a second bore 62 substantially perpendicular to bore 61. The internal surface of bore 62 is threaded so as to receive the retaining screw 42. The external end of screw 42 has a hexagonal depression 63 so that it can be tightened by means of an Allen key. The internal end 64 of screw 42 is rounded.

The part of bore 61 where it is joined by bore 62 is provided with a slightly raised projection or ridge 66, see FIG. 4, of generally triangular cross-section. The ridge 66 extends around substantially the entire circumference of the bore 61, except for the part which is occupied by the internal end of bore 62. The size of ridge 66 is such that the inserted pin 60 still has a certain degree of play in bore 61.

In use, pin 60 is inserted into bore 61 and then the screws are tightened. Screw 49 is tightened first, during which process any fine adjustments are made to the position of pin 60. The tightened screw 49 ensures that the connector system is maintained rigid relative to the rest of the printer. Subsequent tightening of screw 42 ensures that the pin 60 is firmly and precisely attached to the guide rod 17 so that the central region of rod 17 does not move during operation of the printer. It will be noted that, after tightening of screw 42, it lies wholly within bore 62; thus avoids it being contacted by the printer carriage 20 as it slides along the rod 17. It will also be noted that the extension 30 and the connector system 40 are confined to the quadrant around the rod 17 which is not traversed by carriage 20.

An aspect of the above-described arrangement is that the connector system 40 can be connected to the rod 17 without inducing unwanted change in the position of the rod due to inaccuracies of the components. It does this by allowing freedom of adjustment, before tightening the screws 42 and 49, in all six degrees of freedom. Referring to the axes as defined in FIG. 3, relative movement in the Z-direction is achieved by pin 60 sliding in bore 61. Relative movement in the Y-direction is achieved by connector element 41 sliding relative to screw 49 which is permitted by the relative play between these components. This adjustment in the Y-direction can be made without significant movement in the X- or Z-directions. Relative movement in the X-direction is permitted by rotation of element 41 in the theta-Z direction around screw 49 before tightening of this screw. Rotation in the direction theta-Z is permitted by pin 60 rotating within bore 61 around their mutual longitudinal axis. Rotation in the directions theta-X and theta-Y are permitted by pin 60 rocking within bore 61 before tightening of screw 42. The hinge or pivot of these rocking movements, is constituted by the peak of ridge 66, possibly in conjunction with the rounded end 64 of screw 42.

A further aspect of the above-described arrangement is that the rod 17 and the rest of the printer are connected together with substantial rigidity using a relatively inexpensive system which is readily assembled. Only a simple and relatively inexpensive modification of the support 11 is needed to provide extension 30, and this occupies minimal extra space. The arch-shaped part 44 also occupies a small amount of space, yet provides a substantially rigid construction. In addition, it provides a recess for the head of screw 49 so that the latter does not interfere with any other components.

The relative play between the various components of the connector system 40 before the screws are tightened enables the rod to be stiffened and located without significant loss of the straightness. The correct positioning of the pin 60 is advantageous, particularly in the Y- and Z- directions, and since this is directly affected by any rotations in the theta-X direction, the ability to compensate for misalignment of this angle is another advantage.

Various modifications may be made to the above-described arrangement. For example, although use of only a single connector system 40 is described, a plurality of systems, preferably equally-spaced, may be provided at intermediate points along the length of rod 17. This is particularly advantageous for larger hardcopy apparatus. In a further modification, the ends of rod 17 may also be supported in the same way.

The bore 61 and pin 60 may have any convenient cross-section provided that a suitable amount of play is provided. Bore 61 may be closed at the top; bore 62 may extend completely through the rod 17.

Connector element 41 is preferably produced by powder metallurgy in a so-called net-shape forming process. Alternatively, it may be produced by machining. Instead of steel, it may be made of brass.

The hole in sheet member 48 may be an elongated slot $58^1$, FIG. 8, which extends parallel to the arms 45, 46 and which may be of the same width as the shank 51 of screw 49.

Instead of being rounded, the inner end of screw 42 may terminate in a point. It may also be flat, but this reduces the advantage of permitting rotation in the theta-X direction before tightening. The mouth of bore 62 may be widened to improve access to the head of screw 42.

Figure 10:
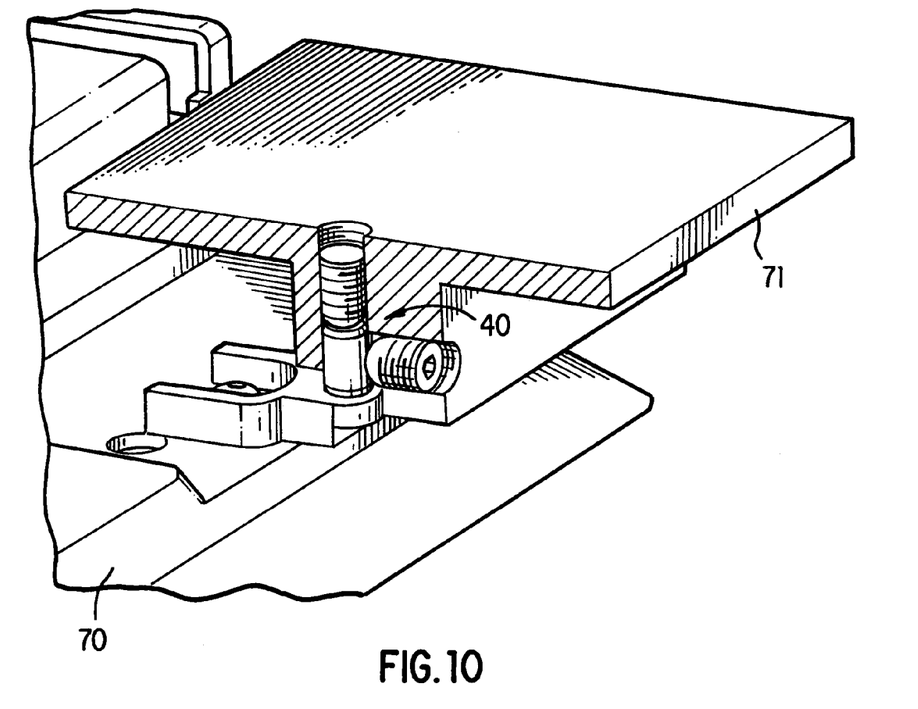
FIG. 10 is a sectioned perspective view of a print platen arrangement of a hardcopy apparatus in accordance with a second embodiment of the present invention.

The connector system 40 may be used in association with the carriage guide arrangement of any hardcopy apparatus such as printers, plotters, scanners, photocopiers or facsimile machines. The guide rod 17 may be replaced by any other suitable guide member such as a V-guide or even a flat guide such as a track member similar to track 22. Moreover, the connector system can be used to connect together other components of hardcopy apparatus which need to be held relatively rigidly. For example, it can be used to mount the guide member for a movable service station carriage. Alternatively, as shown in FIG. 10, it can be used to connect a paper location platen 71 to a supporting beam member 70. In this case the connector system can be used to locate the paper location platen and maintain it straight and parallel to the carriage guide system to obtain even printing. Alternatively, it can be used to adjust the straightness of the platen 71 to compensate for defects in other components.

The connector system can be used to connect together in space, without significant loss of the precision of their relative location, any two bodies with substantial rigidity simply by positioning the connector element and then tightening the screws.

Figure 9:
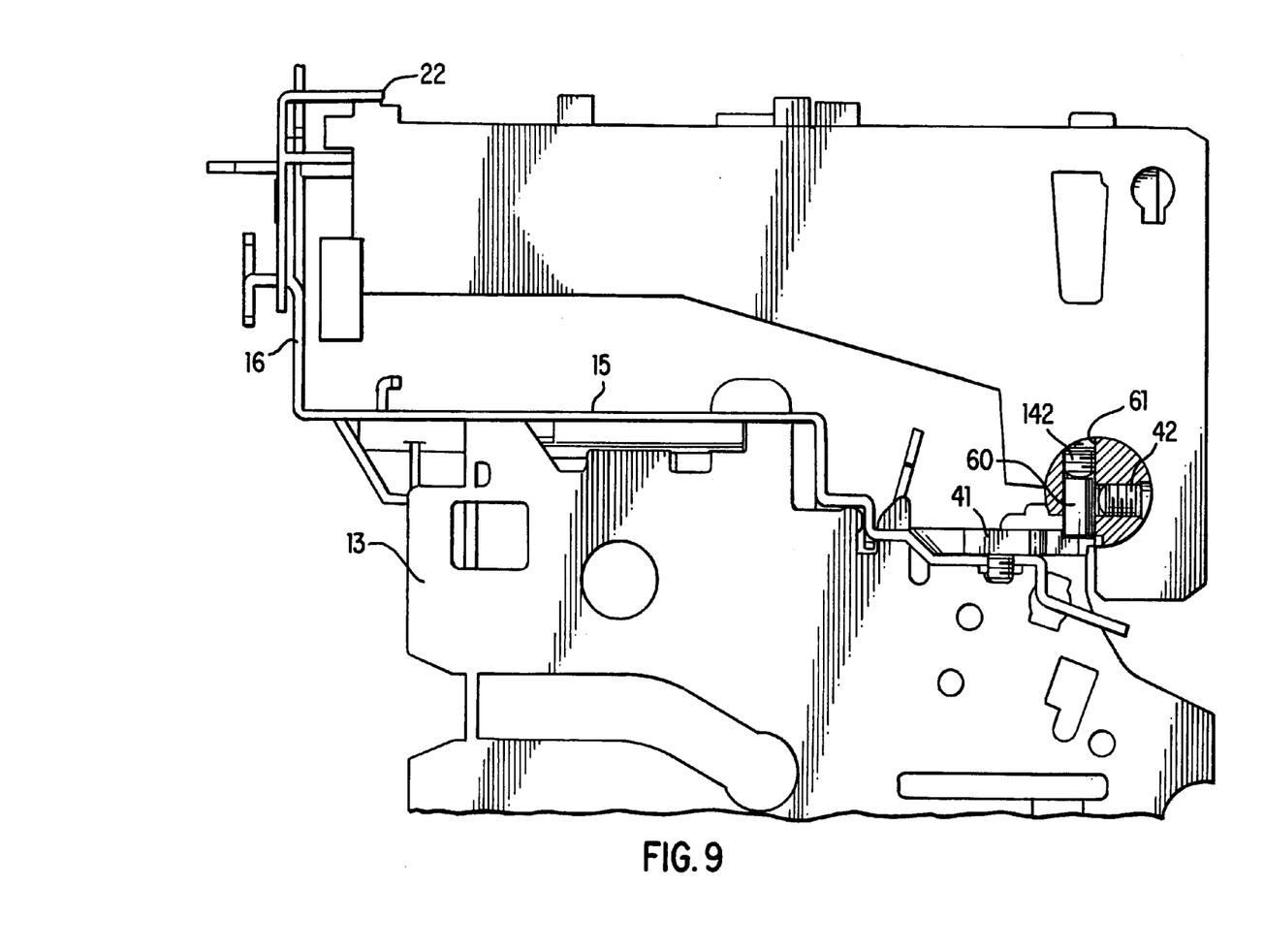
FIG. 9 is a side view of a modification of the arrangement of FIGS. 1 to 6.

In the modification shown in FIG. 9, at least the upper end of bore 61 is threaded and is arranged to be engaged by a grub screw 142. This can be used to adjust the rod 17 in the Z-direction. After assembly of the connector system 40 but before final tightening of screw 42, grub screw 142 is screwed into bore 61 to push pin 60 down relative to the rod 17. This effectively provides vertical positioning of the rod at that point by means of internal adjustment without the need for external tooling. Internal adjustment allows the forces of adjustment to be locked into the system, so the system cannot change. An external adjustment system would induce forces due to the adjustment, and when removed the change in the force balance would shift the components.

For a long rod, this adjustment can be used to rectify the bow due to self-weight, or produce a desired bow for compensation of bow in another part of the system. For this system to work in both up and down directions the rod can be weighted down to thus ensure that the adjustment is always up. When inserted and tightened, screw 142 lies substantially wholly within bore 61.

An aspect of the modification of FIG. 9 is that vertical adjustment is possible without significant movement in the horizontal direction. This permits compensation for any inaccuracies in any other components of the carriage guide arrangement. This vertical adjustment is in addition to the adjustment in the Y-direction permitted by the play between the hole or the slot in sheet member 48 and screw 49 as described in connection with the embodiment of FIGS. 1 to 6.

The heads of screws 42, 49, and 142 may be configured to be operated by screwdrivers or Allen keys as desired.

Supports 11, 12, 13 may be of any suitable structural material such as extruded aluminium or injected plastic (typically with reinforcement glassfibre).

It will be understood that the above description of the present invention is susceptible to various modifications, changes and adaptations.

What has been described and illustrated herein is a preferred embodiment of the invention along with some of its variations. The terms, descriptions and figures used herein are set forth by way of illustration only and are not meant as limitations. Those skilled in the art will recognise that many variations are possible within the spirit and scope of the invention, which is intended to be defined by the following claims—and their equivalents—in which all terms are meant in their broadest reasonable sense unless otherwise indicated.

What is claimed is:

1. A hardcopy apparatus comprising:
   first and second bodies;
   a connector system connecting the first and second bodies together in a substantially rigid manner;
   said first body having intersecting first and second bores;
   said connector system comprising a connector element and a retaining element, said connector element comprising a first connector portion located in said first bore and a second connector portion connected to said second body in a substantially rigid manner; and said retaining element being located in said second bore in retaining engagement with said first connector portion in said first bore, wherein said first bore, in the region where it is intersected by said second bore, is provided with a partly-circumferential ridge.

2. The hardcopy apparatus according to claim 1, wherein said first body is a guide member of a carriage guide arrangement and said second body is a base support of said carriage guide arrangement.

3. The hardcopy apparatus according to claim 1, wherein the second connector portion has a through hole and is substantially rigidly connected to said second body by means of a screw passing through said hole, said screw having a cylindrical portion, and said hole being larger in at least one direction than the diameter of said cylindrical portion.

4. The hardcopy apparatus according to claim 1, wherein said first body is a print platen and said second body is a base support of said print platen.

5. The hardcopy apparatus according to claim 1, wherein said first bore is cylindrical and said first connector portion comprises a cylindrical pin having a cylindrical surface, the diameter of said pin being less than the diameter of said first bore.

6. The hardcopy apparatus according to claim 5, wherein the end of said retaining element engages said cylindrical surface of said first connector portion, said end of the retaining element being rounded.

7. The hardcopy apparatus of claim 3, wherein the first body has a longitudinal axis extending perpendicular to said first and second bores, wherein said through hole in said second connector portion is larger in a direction which is perpendicular to said longitudinal axis.

8. The hardcopy apparatus according to claim 1, wherein said first bore has a region not occupied by said first connector portion, said bore region being threaded, and wherein said connector system comprises a screw member extending along and within and in engagement with said threaded bore region, said screw member having an end capable of engaging said first connector portion to exert a force thereon.

9. A hardcopy apparatus comprising:
first and second bodies;
a connector system connecting the first and second bodies together in a substantially rigid manner;
said first body having intersecting first and second bores;
said connector system comprising a connector element and a retaining element, said connector element comprising a first connector portion located in said first bore and a second connector portion connected to said second body in a substantially rigid manner; and
said retaining element being located in said second bore in retaining engagement with said first connector portion in said first bore, wherein the second connector portion has a through hole and is substantially rigidly connected to said second body by means of a screw passing through said hole, said screw having cylindrical shank portion, and said hole being larger in at least one direction than the diameter of said cylindrical shank portion.

10. The hardcopy apparatus according to claim 9, wherein said first body is a guide member of a carriage guide arrangement and said second body is a base support of said carriage guide arrangement.

11. The hardcopy apparatus according to claim 9, wherein the first body has a longitudinal axis extending perpendicular to said first and second bores, wherein said through hole in said second connector portion is larger in a direction which is perpendicular to said longitudinal axis.

12. The hardcopy apparatus according to claim 9, wherein said first bore has a region not occupied by said first connector portion, said bore region being threaded, and wherein said connector system comprises a screw member extending along and within and in engagement with said threaded bore region, said screw member having an end capable of engaging said first connector portion to exert a force thereon.

13. The hardcopy apparatus according to claim 9, wherein said first body is a print platen and said second body is a base support of said print platen.

14. A hardcopy apparatus comprising:
first and second bodies;
a connector system connecting the first and second bodies together in a substantially rigid manner;
said first body having intersecting first and second bores;
said connector system comprising a connector element and a retaining element, said connector element comprising a first connector portion located in said first bore and a second connector portion connected to said second body in a substantially rigid manner; and
said retaining element being located in said second bore in retaining engagement with said first connector portion in said first bore, wherein said first bore has a region not occupied by said first connector portion, said bore region being threaded, and wherein said connector system comprises a screw member extending along and within and in engagement with said threaded bore region, said screw member having an end capable of engaging said first connector portion to exert a force thereon.

15. The hardcopy apparatus according to claim 14, wherein said first body is a guide member of a carriage guide arrangement and said second body is a base support of said carriage guide arrangement.

16. The hardcopy apparatus according to claim 14, wherein said first body is a print platen and said second body is a base support of said print platen.

17. A hardcopy apparatus comprising:
a substantially fixed supporting structure;
a carriage guide arrangement comprising a base support and a carriage guide rod, wherein said base support is substantially fixedly mounted on first and second end supports and wherein said carriage guide rod is supported by said first and second end supports;
said base support defining a track spaced from said guide rod, wherein a movable carriage is arranged to move along said guide rod and said track;
a connector system respectively provided at one or more spaced locations along said guide rod to substantially rigidly connect together said guide rod and said base support;
wherein said guide rod is provided at each said location with first and second intersecting cylindrical bores, at least said second bore being threaded;
each said connector system comprising a connector element and first and second retaining screws, said connector element comprising first and second connector portions, said first connector portion having a cylindrical pin located in said first bore and said second connector portion having a through hole;
said first retaining screw being located in said second bore in retaining engagement with said cylindrical pin in said first bore;

said base support being provided at each said location with a threaded hole, and said second retaining screw passing through said hole in said second connector portion and being located in said threaded hole in said base support, whereby said guide rod and said base support are substantially rigidly connected together at said one or more spaced locations; and said screw having a cylindrical shank portion, said hole in said second connector portion being larger in at least one direction than the diameter of said cylindrical shank portion.

18. The hardcopy apparatus according to claim 17, wherein the first body has a longitudinal axis extending perpendicular to said first and second bores, wherein said hole in said second connector portion is larger in a direction which is perpendicular to said longitudinal axis.

19. The hardcopy apparatus according to claim 17, wherein said first bore is cylindrical and said first connector portion comprises a cylindrical pin, the diameter of said pin being less than the diameter of said first bore.

20. A connector system for connecting a first body with intersecting first and second bores to a second body, the system comprising:

a connector element and a retaining element;

said connector element having a first connector portion arranged to be inserted into said first bore and a second connector portion arranged to be substantially rigidly connected to said second body;

wherein said retaining element is arranged to be inserted into said second bore to engage said first connector portion in said first bore and to retain said first connector portion substantially firmly in position, wherein the second connector portion has a through hole and is substantially rigidly connected to said second body by means of a screw passing through said hole, said screw having a cylindrical shank portion, said hole being larger in at least one direction than the diameter of said cylindrical shank portion; and wherein said first bore has a region not occupied by said first connector portion, said bore region being threaded, and wherein said connector system comprises a screw member extending along and within and in engagement with said threaded bore region, said screw member having an end capable of engaging said first connector portion to exert a force thereon.

21. A connector system for connecting a first body with intersecting first and second bores to a second body, the system comprising:

a connector element and a retaining element;

said connector element having a first connector portion arranged to be inserted into said first bore and a second connector portion arranged to be substantially rigidly connected to said second body;

wherein said retaining element is arranged to be inserted into said second bore to engage said first connector portion in said first bore and to retain said first connector portion substantially firmly in position, wherein the second connector portion has a through hole and is substantially rigidly connected to said second body by means of a screw passing through said hole, said screw having a cylindrical shank portion, said hole being larger in at least one direction than the diameter of said cylindrical shank portion; and wherein said first bore, in the region where it is intersected by said second bore, is provided with a partly-circumferential ridge.

22. A method of substantially rigidly connecting together first and second bodies having mutually parallel longitudinal axes, said method comprising:

providing first and second intersecting bores in said first body, said bores extending perpendicularly to said longitudinal axes, said first bore, in the region where it is intersected by said second bore, being provided with a partly-circumferential ridge;

providing a connector system comprising a connector element and a retaining element, wherein said connector element comprises first and second connector portions, said first connector portion comprising a cylindrical pin having a cylindrical surface, the diameter of said pin being less than the diameter of said first bore, and wherein said retaining element has a rounded end;

inserting said first connector portion in said first bore;

inserting said retaining element in said second bore whereby said rounded end engages said cylindrical surface of said first connector portion and retains it against said ridge in said first bore; and securing said second connector portion to said second body in a substantially firm manner.

23. A method of substantially rigidly connecting together a guide member and a base support structure of a carriage guide arrangement of a hardcopy apparatus, said guide member and said base support structure having mutually parallel axes, the method comprising:

providing supports for the guide member at or adjacent its ends;

providing points of attachment at one or more intermediate positions between said supports by providing first and second intersecting bores in said guide member at each point of attachment, said bores extending perpendicularly to said longitudinal axes, each said first bore, in the region where it is intersected by its respective second bore, being provided with a partly circumferential ridge;

locating a connector system at each point of attachment, said connector system comprising a connector element and a retaining element, said connector element comprising a first connector portion and a second connector portion, each said first connector portion comprising a cylindrical pin having a cylindrical surface, the diameter of said pin being less than the diameter of said first bore, and wherein each said retaining element has a rounded end; and locating each said first connector portion in its respective first bore, and substantially rigidly connecting together said guide member and said base support structure by substantially firmly securing each said second connector portion of said connector element to said base support structure and by inserting each said retaining element in its respective second bore whereby each said rounded end engages said cylindrical surface of its respective first connector portion to retain said first connector portions against said ridges in said first bores.

24. The method according to claim 23, further comprising:

manipulating at least one of said first connector portion and said second connector portion to move said first body with respect to said second body.

25. A hardcopy apparatus comprising:

first and second bodies;

a connector system according to the first and second bodies together in a substantially rigid manner;

said first body having intersecting first and second bores;

said connector system comprising a connector element and a retaining element, said connector element comprising a first connector portion located in said first bore and a second connector portion connected to said second body in a substantially rigid manner; and said retaining element being located in said second bore in retaining engagement with said first connector portion in said first bore, said first connector portion being movable into an adjusted position along said first bore and being rotatable about any axis into an adjusted orientation relative to said first bore before said first and second bodies are connected together in substantially rigid manner, and said second connector portion being movable into an adjusted position along said second body and being rotatable into an adjusted orientation over the surface of said second body before said second connector portion and said second body are connected together in substantially rigid manner.

26. The method according to claim 25, further comprising:

manipulating at least one of said first connector portion and said second connector portion to move said guide member with respect to said base support structure.

* * * * *